Mar. 5, 1929.  C. H. SCHULTZ  1,703,901
ORNAMENT HANGER FOR CHRISTMAS TREES
Filed Sept. 23, 1927

INVENTOR.
CARL H. SCHULTZ
BY
ATTORNEY.

Patented Mar. 5, 1929.

1,703,901

UNITED STATES PATENT OFFICE.

CARL H. SCHULTZ, OF MILWAUKEE, WISCONSIN.

ORNAMENT HANGER FOR CHRISTMAS TREES.

Application filed September 23, 1927. Serial No. 221,420.

This invention relates to ornament hangers for Christmas trees.

One object of the present invention is the provision of an improved hanger of simple and economical design capable of ready application to twigs and branches of various sizes and which, when applied, will insure an unusually secure anchorage for the ornament.

Other more specific objects and advantages will appear from the following description of illustrative embodiments thereof.

In the drawings:—

Fig. 3 is a view in side elevation of a hanger of slightly different form for supporting candy canes and the like.

Figure 1:
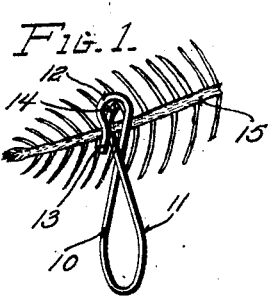
Figure 1 is a perspective view of a hanger constructed in accordance with the present invention, showing the same applied to a twig of a tree.
Figure 2:
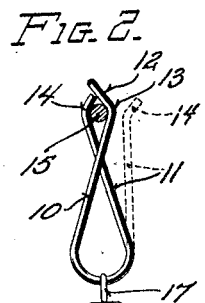
Fig. 2 is a view in side elevation illustrating the method of applying the same.

The hanger shown in Figures 1 and 2 is formed of spring wire bent into U-form so as to provide normally spaced legs 10 and 11. The free end of leg 10 is reversely bent to form an open loop 12 and further bent, as at 13, so that the loop 12 extends outwardly and upwardly from the main portion of the leg 10. The free end of the leg 11 is also bent outwardly, as at 14, so that when the two legs are pressed into intersecting relation, as indicated in full lines in Figure 2, the bent portions 13 and 14 coact to form jaws designed to firmly grip the twig 15 therebetween. It will be noted from Figure 1 that the loop 12 provides a two-point contact for one side of the twig while the leg 11, bent in the manner described, makes contact with the other side of the twig intermediate the two points of contact established by the loop. A firm binding action of the hanger upon the twig is thus assured.

To apply an ornament, such a ball 16, to the tree the leg 11, in the dotted line position of Figure 2, is passed through the usual eye 17 with which the ball is provided. The free end of the leg 11 is then pressed rearwardly through the loop a sufficient distance to permit entry of the twig or branch 15 therebetween, so that, upon releasing the legs, the twig or branch is firmly gripped between the bent portions 13 and 14 in the manner above described.

Figure 3:
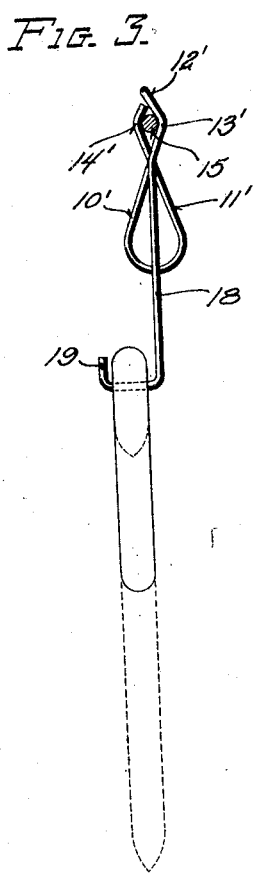
Figure 4:
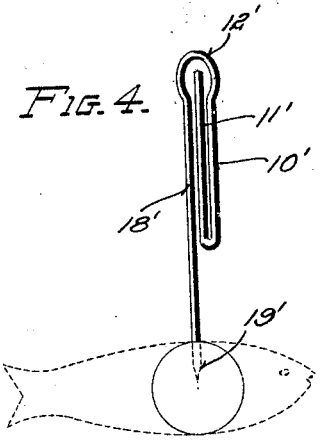
Fig. 4 is a view in front elevation of another form of hanger designed to support other candy objects.

The form of hangers shown in Figures 3 and 4 are similar to that just described in that each constitutes a U-shaped portion having legs 10' and 11', each bent at 13' and 14', and being formed with a leg 10', which parts coact in the manner above described to grip a twig or branch of a tree. In the form shown in Figure 3 the loop 12' supports a depending portion 18, bent at its lower end to form an appropriate hook 19 for receiving a candy cane or the like; and in the form shown in Figure 4 of the loop 12' supports a similar depending portion 18', preferably sharpened at its lower end 19' for anchorage in a candy object. I have found that a satisfactory anchorage may be readily obtained by heating the end 19' prior to entry thereof into the candy object and thereafter permitting the same to cool.

Various changes may be made in any of the embodiments of the invention hereinabove specifically described without departing from or sacrificing the advantages of the invention as defined in the appended claims.

I claim:—

1. An ornament hanger for Christmas trees comprising a hook having an unobstructed body portion adapted to be threaded through an eye of an ornament to support the same, a loop formed upon one end of said hook, the other end of said hook being movable through said loop to close said hook to thereby retain the ornament thereon and to coact with said loop to form a resilient clamp for receiving a twig or branch of a tree.

2. An ornament hanger for Christmas trees comprising a resilient body portion having two legs, one of said legs having a loop, the other of said legs having a portion adapted to be flexed through said loop to form a resilient clamp for a twig or branch of a tree, and means depending from one of said legs for receiving an ornament.

In witness whereof, I hereunto subscribe my name this 21st day of September, 1927.

CARL H. SCHULTZ.